(12) United States Patent
Lashkari et al.

(10) Patent No.: US 11,447,128 B2
(45) Date of Patent: Sep. 20, 2022

(54) METHOD AND SYSTEM FOR OPERATING AN ON-VEHICLE LIDAR SENSOR

(71) Applicant: GM GLOBAL TECHNOLOGY OPERATIONS LLC, Detroit, MI (US)

(72) Inventors: Negin Lashkari, Markham (CA); Arash Mohtat, North York (CA); Kai Yue Peter Yap, Markham (CA)

(73) Assignee: GM Global Technology Operations LLC, Detroit, MI (US)

( * ) Notice: Subject to any disclaimer, the term of this patent is extended or adjusted under 35 U.S.C. 154(b) by 163 days.

(21) Appl. No.: 16/862,223

(22) Filed: Apr. 29, 2020

(65) Prior Publication Data
US 2021/0339738 A1  Nov. 4, 2021

(51) Int. Cl.
*B60W 30/08* (2012.01)
*B60W 40/02* (2006.01)
*B60W 40/10* (2012.01)

(52) U.S. Cl.
CPC ............ *B60W 30/08* (2013.01); *B60W 40/02* (2013.01); *B60W 40/10* (2013.01); *B60W 2420/52* (2013.01); *B60W 2510/20* (2013.01); *B60W 2520/28* (2013.01); *B60W 2555/20* (2020.02)

(58) Field of Classification Search
CPC ...... B60W 30/08; B60W 40/02; B60W 40/10; B60W 2555/20; B60W 2420/52; B60W 2510/20; B60W 2520/28
See application file for complete search history.

(56) References Cited

U.S. PATENT DOCUMENTS

| 2017/0154463 A1* | 6/2017 | von Cramon ........... G06T 7/586 |
| 2018/0276986 A1* | 9/2018 | Delp ...................... B60K 35/00 |
| 2021/0339738 A1* | 11/2021 | Lashkari ............... B60W 40/10 |

* cited by examiner

*Primary Examiner* — Peter D Nolan
*Assistant Examiner* — Wae L Louie
(74) *Attorney, Agent, or Firm* — Quinn IP Law

(57) ABSTRACT

A spatial monitoring system for a vehicle includes a LiDAR sensor, sensors arranged to monitor ambient environmental states, sensors arranged to monitor vehicle operating conditions, and a controller. The controller includes an instruction set that is executable to monitor the ambient environmental states and the vehicle operating conditions. The LiDAR sensor captures a point cloud, and the instruction set is executable to determine point cloud metrics. Desired control parameters for the LiDAR sensor are determined based upon the ambient environmental conditions, the vehicle operating conditions, and the point cloud metrics, and the LiDAR sensor is controlled based upon the desired control parameters. The LiDAR sensor is controlled to capture an image of a field-of-view proximal to the vehicle based upon the desired control parameters.

20 Claims, 4 Drawing Sheets

METHOD AND SYSTEM FOR OPERATING AN ON-VEHICLE LIDAR SENSOR

INTRODUCTION

Vehicles, including those vehicles employing advanced driver assistance systems (ADAS) and autonomous systems, may make use of information from on-vehicle LiDAR sensors to inform an operator and/or to direct operational control of one or more systems of a vehicle. ADAS and autonomous systems may use information from a LiDAR sensor for controlling one or more systems such as braking, cornering and acceleration.

LiDAR sensors may include, by way of example, mechanical spinning devices, or solid-state devices that include MEMS (micro-electromechanical system) devices. LiDAR sensors are set to operate at fixed default settings regardless of circumstances such as weather, vehicle speed, etc. The default settings lead to acceptable performance under ideal conditions but may perform sub-optimally in other conditions, e.g., in inclement weather. LiDAR point clouds collected in inclement weather such as rain, snow, fog, etc. may experience a low signal to noise ratio, e.g., more noisy data, less number of points, decreased observation range, reflectivity-wise anomalies and other perception-artifact-inducing phenomena as compared to LiDAR point clouds that are collected under non-inclement weather conditions. This may serve to reduce effectiveness of a LiDAR sensor under certain conditions, which may lead to reducing or disabling vehicle ADAS or autonomous systems. It is desirable to have a fully-operational LiDAR sensor over a broad range of conditions to maintain the effectiveness of a LiDAR sensor.

SUMMARY

A spatial monitoring system for a vehicle is described, and includes a LiDAR sensor, a first plurality of sensors arranged to monitor ambient environmental states, a second plurality of sensors arranged to monitor vehicle operating conditions, and a controller. The controller is in communication with the first plurality of sensors and the second plurality of sensors, and is operatively connected to the LiDAR sensor. The controller includes an instruction set that is executable to monitor, via the first plurality of sensors, the ambient environmental states, and monitor, via the second plurality of sensors, the vehicle operating conditions. The LiDAR sensor captures a point cloud and the instruction set is executable to determine point cloud metrics. Desired control parameters for the LiDAR sensor are determined based upon the ambient environmental conditions, the vehicle operating conditions, and the point cloud metrics, and the LiDAR sensor is controlled based upon the desired control parameters. The LiDAR sensor is controlled to capture an image of a field-of-view proximal to the vehicle based upon the desired control parameters.

An aspect of the disclosure includes the LiDAR sensor being a mechanical spinning LiDAR sensor, wherein the desired control parameters comprise a spinning rate and a laser power level. The instruction set is executable to determine the desired control parameters for the spinning rate and/or the laser power level of the LiDAR sensor based upon the ambient environmental conditions, the vehicle operating conditions and the point cloud metrics.

Another aspect of the disclosure includes the LiDAR sensor being a solid state LiDAR sensor, wherein the desired control parameters comprise a scanning pattern, a scan density across field-of-view, a frame rate, and a laser power for the LiDAR sensor. The instruction set is executable to determine the desired control parameters for one of the scanning pattern, the scan density across field-of-view, the frame rate, and the laser power for the LiDAR sensor based upon the ambient environmental conditions, the vehicle operating conditions and the point cloud metrics.

Another aspect of the disclosure includes the first plurality of sensors being arranged to monitor ambient environmental states comprises a plurality of sensors configured to monitor ambient pressure and temperature.

Another aspect of the disclosure includes the second plurality of sensors being arranged to monitor vehicle operating conditions comprises a plurality of sensors configured to monitor vehicle wheel speed and steering angle.

Another aspect of the disclosure includes the instruction set being executable to determine a quantity of points with zero range or reflectivity values, mean, median, standard deviation and a minimum/maximum interval of range and reflectivity for nonzero measurements for the point cloud of the LiDAR sensor.

Another aspect of the disclosure includes the instruction set being executable to employ a reinforcement learning routine in a simulation pre-training mode to determine the desired control parameters for the LiDAR sensor that maximize the point cloud metrics of the LiDAR sensor based upon the ambient environmental conditions and the vehicle operating conditions.

Another aspect of the disclosure includes the instruction set being executable to employ a reinforcement learning routine in-use to determine the desired control parameters for the LiDAR sensor that maximize the point cloud metrics of the LiDAR sensor based upon the ambient environmental conditions and the vehicle operating conditions.

Another aspect of the disclosure includes a vehicle including an advanced driver assistance system (ADAS) and a spatial monitoring system. The spatial monitoring system includes a LiDAR sensor, including a plurality of desired control parameters, a first plurality of sensors arranged to monitor ambient environmental states, a second plurality of sensors arranged to monitor vehicle operating conditions, and a controller. The controller is in communication with the first plurality of sensors and the second plurality of sensors, and operatively connected to the LiDAR sensor, the controller including an instruction set. The instruction set is executable to monitor, via the first plurality of sensors, the ambient environmental states, monitor, via the second plurality of sensors, the vehicle operating conditions, and capture, via the LiDAR sensor, a point cloud. The instruction set determines metrics for the point cloud, determines desired control parameters for the LiDAR sensor based upon the ambient environmental conditions, the vehicle operating conditions, and the point cloud metrics, and controls the LiDAR sensor to capture an image of a field-of-view proximal to the vehicle based upon the desired control parameters. The ADAS controls operation of the vehicle based upon the image of the field-of-view proximal to the vehicle.

Another aspect of the disclosure includes a method for monitoring a spatial environment for a vehicle that includes monitoring a plurality of ambient environmental states, monitoring vehicle operating conditions, capturing, via a LiDAR sensor, a point cloud, determining metrics for the point cloud, and determining desired control parameters for the LiDAR sensor based upon the ambient environmental conditions, the vehicle operating conditions, and the point cloud metrics. Operation of the LiDAR sensor is controlled to capture an image of a field-of-view proximal to the vehicle based upon the desired control parameters.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

It should be understood that the appended drawings are not necessarily to scale, and present a somewhat simplified representation of various features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. For purposes of convenience and clarity, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein. As used herein, the term "system" may refer to one of or a combination of mechanical and electrical hardware, sensors, controllers, application-specific integrated circuits (ASIC), combinatorial logic circuits, software, firmware, and/or other components that are arranged to provide the described functionality.

Figure 1:
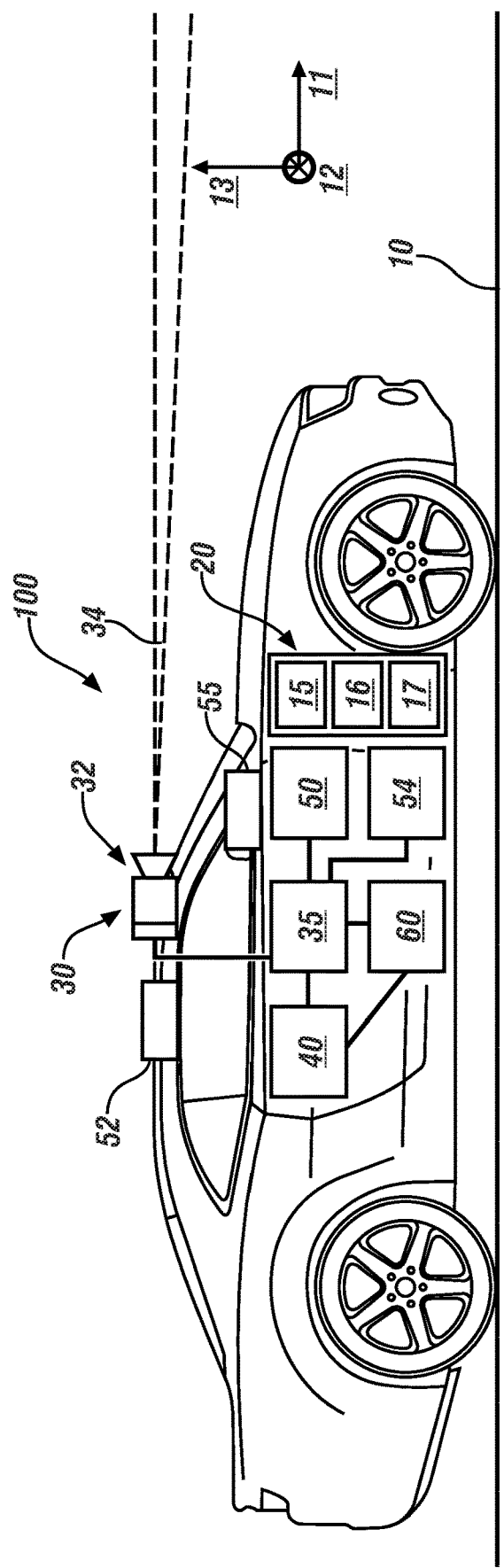
FIG. 1 schematically illustrates a side-view of a vehicle including a spatial monitoring system, wherein the vehicle is disposed on a travel surface, in accordance with the disclosure.

Referring to the drawings, wherein like reference numerals correspond to like or similar components throughout the several Figures, FIG. 1, consistent with embodiments disclosed herein, schematically illustrates a vehicle 100 that is disposed on a travel surface 10, wherein the vehicle 100 includes a propulsion system 15, a steering system 16, a wheel braking system 17, an advanced driver assistance system (ADAS) 20, a spatial monitoring system 30, a navigation system 40, a first plurality of sensors 50 that are arranged to monitor vehicle operating conditions, and a second plurality of sensors 54 that are arranged to monitor ambient environmental conditions. A side-view of the vehicle 100 is shown. The vehicle 100 and the travel surface 10 define a three-dimensional coordinate system including a longitudinal or y-axis 11, a lateral or x-axis 12 and an elevation or z-axis 13. The spatial monitoring system 30 includes a LiDAR sensor 32. Information from the first plurality of sensors 50 arranged to monitor vehicle operating conditions, and a second plurality of sensors 54 arranged to monitor ambient environmental conditions may be complemented or supplemented by information obtained from extra-vehicle sources using V2X communications via a telematics system 60, as described herein. The concepts described herein provide a system and method for determining desired control parameters for the LiDAR sensor 32 based upon ambient environmental conditions, vehicle operating conditions, and LiDAR point cloud metrics employing reinforcement learning methodologies, and dynamically controlling the LiDAR sensor 32 based upon the desired control parameters. The desired control parameters for controlling the LiDAR sensor 32 define an action space, an example of which is described with reference to FIG. 5.

Other on-vehicle systems may include, by way of non-limiting examples, a computer-readable storage device or media (memory) that includes a digitized roadway map, the telematics system 60, a global navigation satellite system (GNSS) sensor 52, and a human/machine interface (HMI) device 55. The concepts described herein may be employed on various systems that may benefit from information determined from an embodiment of the spatial monitoring system 30 in a manner that is described herein. The vehicle 100s may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

In one embodiment, and as described herein, the spatial monitoring system 30 includes a light detection and radar (LiDAR) sensor 32 that has a field-of-view (FOV) of a viewable region 34 that includes a travel surface that is proximal to and forward of the vehicle 100, and is in communication with a spatial monitoring controller 35. Alternatively, or in addition, the LiDAR sensor 32 has a FOV of a viewable region 34 that includes a travel surface 10 that is beside and or rearward of the vehicle 100. The LiDAR sensor 32 has an on-vehicle position and orientation that can be characterized, including, e.g., height $h_{cam}$ and angle $\theta_{cam}$, which are defined relative to the elevation axis 13. One or multiple LiDAR sensors 32 may be employed.

The spatial monitoring system 30 may include other spatial sensors and systems that are arranged to monitor the viewable region 34 forward of the vehicle 100 including, e.g., a surround-view camera or a radar sensor, which may be employed to supplement or complement spatial information that is generated by the LiDAR sensor 32. Each of the spatial sensors, including the LiDAR sensor 32, is disposed on-vehicle to monitor the viewable region 34 to detect proximate remote objects such as road features, lane markers, buildings, pedestrians, road signs, traffic control lights and signs, other vehicles, and geographic features that are proximal to the vehicle 100. The spatial monitoring controller 35 can evaluate inputs from the spatial sensors to determine a linear range, relative speed, and trajectory of the vehicle 100 in view of each proximate remote object. As employed herein, the terms "proximate", "proximal" and related terms refer to stationary and mobile objects that are in the vicinity of the vehicle 100 such that they are discernible by one or more of the spatial sensors connected to the spatial monitoring controller 35 including the spatial monitoring system 30.

The first plurality of sensors 50 includes sensors that are arranged to monitor vehicle operating conditions, including, e.g., vehicle speed, acceleration, braking, steering angle, yaw rate, etc. The second plurality of sensors 54 includes sensors that are arranged to monitor ambient environmental conditions including, e.g., time-of-day, elevation, ambient pressure, ambient temperature, humidity (dew point), precipitation, etc. Alternatively, or in addition, a portion of the ambient environmental conditions may be obtained by connectivity to a proximal weather station or other vehicles employing using V2X communications via the telematics system 60.

The telematics system 60 provides extra-vehicle communications, including communicating with a communication network that may include wireless and wired communication capabilities. The telematics system 60 includes a telematics controller that is capable of extra-vehicle communications that includes vehicle-to-everything (V2X) communication. The V2X communication includes short-range vehicle-to-vehicle (V2V) communication, and communication with one or more roadside units, thus facilitating localized communication between a plurality of similarly-situated vehicles. Alternatively, or in addition, the telematics system 60 is capable of short-range wireless communication to a handheld device, e.g., a cell phone, a satellite phone or another telephonic device. In one embodiment the handheld device is loaded with a software application that includes a wireless protocol to communicate with the telematics controller, and the handheld device executes the extra-vehicle communication, including communicating with an off-board controller via a communication network.

Alternatively, or in addition, the telematics system 60 executes the extra-vehicle communication directly by communicating with the off-board controller via the communication network.

The ADAS 20 is arranged to provide operator assistance features by controlling one or more of the propulsion system 15, the steering system 16, the wheel braking system 17, with little or no direct interaction of the vehicle operator. The ADAS 20 includes a controller and one or a plurality of subsystems that provide operator assistance features, including one or more of an adaptive cruise control (ACC) system, a lane-keeping control (LKY) system, a lane change control (LCC) system, an autonomous braking/collision avoidance system, and/or other systems that are configured to command and control autonomous vehicle operation separate from or in conjunction with operator requests. The ADAS 20 may interact with and access information from an on-board map database for route planning and to control operation of the vehicle 100 via the lane-keeping system, the lane-centering system, and/or other systems that are configured to command and control autonomous vehicle operation. Autonomous operating commands may be generated to control the ACC system, the LKY system, the LCC system, the autonomous braking/collision avoidance system, and/or the other systems. Vehicle operation includes operation in a propulsion mode in response to desired commands, which can include operator requests and/or autonomous vehicle requests. Vehicle operation, including autonomous vehicle operation includes acceleration, braking, steering, steady-state running, coasting, and idling. Operator requests can be generated based upon operator inputs to an accelerator pedal, a brake pedal, a steering wheel, a transmission range selector, the ACC system, etc. As employed herein, the ADAS 20 controls operation of the vehicle 100 based upon input from the LiDAR sensor 32, and based upon other inputs from the spatial monitoring system 30.

The term "controller" and related terms such as microcontroller, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffering and other components, which can be accessed and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, an electromagnetic signal via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium. A parameter is defined as a measurable quantity that represents a physical property of a device or other element that is discernible using one or more sensors and/or a physical model. A parameter can have a discrete value, e.g., either "1" or "0", or can be infinitely variable in value.

The LiDAR sensor 32 is a sensing device and associated signal processing system that detects objects and maps their distances by illuminating, via a laser, a target with an optical pulse and measuring characteristics of reflected beams. The LiDAR sensor 32 may be a mechanical LiDAR sensor, a solid-state LiDAR sensor, or another configuration.

When the LiDAR sensor 32 is a mechanical LiDAR sensor, it employs high-grade optics and a rotating assembly to create a wide field-of-view (FOV), which may be 360 degrees of rotation in one embodiment. The mechanical configuration provides a high signal-to-noise ratio (SNR) over a wide FOV. When the LiDAR sensor 32 is a solid-state LiDAR device, there are no spinning mechanical components, with a resulting narrow FOV. There may be multiple channels at the front, rear and sides of the vehicle 100 with signal processing that includes data fusion to generate a wide FOV.

Solid-state LIDAR sensors have multiple implementation methods. A MEMS (micro-electromechanical system) LiDAR sensor uses tiny mirrors whose tilt angle varies when applying a stimulus such as a voltage. In effect, the MEMS LiDAR system substitutes mechanical scanning hardware with an electromechanical equivalent. A receiver light collection aperture determines a receive SNR that may be small, e.g., a few millimeters, for a MEMS LiDAR sensor. To move the laser beam in multiple dimensions requires cascading multiple mirrors.

A flash LIDAR sensor operates in a manner analogous to that of a digital camera using an optical flash. In flash LIDAR, a single large-area laser pulse is employed to illuminate the environment in front of it and a focal plane array of photodetectors is placed in close proximity to the laser to capture back-scattered light. The photodetector captures the image distance, location and reflected intensity.

An optical phase array (OPA) sensor operates in a manner that is similar to a phased-array radar. In an OPA system, an optical phase modulator controls the speed of light passing through the lens. Controlling the speed of light enables control of the optical wave-front shape. The top beam is not delayed, while the middle and bottom beam are delayed by increasing amounts. This phenomenon effectively steers the laser beam to point in different directions.

A frequency-modulated continuous wave (FMCW) LIDAR sensor employs a coherent method to produce brief chirps of frequency-modulated laser light. Measuring the phase and frequency of the return chirp enables the FMCW LiDAR sensor to measure both distance and velocity.

When the LiDAR sensor 32 is a mechanical spinning LiDAR sensor, desired control parameters include, by way of non-limiting examples, a spinning rate (e.g. 300-1200 RPM), laser power, noise level (initial filtering on the firmware side), laser return mode (last/strongest/dual), and intrinsic calibration parameters for all laser channels.

When the LiDAR sensor 32 is a solid-state LiDAR sensor, desired control parameters include scanning pattern (orientation of scanning lines, density of scans across field-of-view, stride/interlacing of lines), frame rate, laser power, noise level, laser return mode (last/strongest/dual), and intrinsic calibration parameters for the laser.

The concepts described herein provide a vehicle, an associated spatial monitoring system for a vehicle, and a method that optimally operates a LiDAR sensor by varying controllable parameters of the LiDAR sensor, e.g., laser power, frame rate, etc., according to vehicle and ambient environmental conditions, such as vehicle speed, precipitation, etc. By gathering experience in simulated and real-world environments and learning by reinforcement learning, this may lead to improved point cloud measurement quality, including better signal-to-noise ratio, more measured points, less noise, less precipitation particle interference, wider reflectivity and range measurement distributions, etc. as compared to a system that does not employ such techniques. The LiDAR sensor 32 may be operated by varying controllable parameters (e.g. laser power, frame rate, etc.) according to vehicle and ambient environmental conditions instead of keeping them fixed at the prescribed default values. The result is improved point cloud measurement quality.

Some of the LiDAR controllable parameters may be adaptively varied based on rules based on expert a priori knowledge. In such cases, those specific controllable parameters may be excluded from the action space, which is associated with reinforcement learning, or may be kept in the action space with the portion of the deep neural network responsible for generating those dimensions of the action space that are being trained separately. This separate training can be accomplished in a purely supervised, non-reinforced manner to reproduce the expert rule, with specific ones of weights being frozen thereafter so iterative reinforcement training does not affect those weights.

Figure 2:
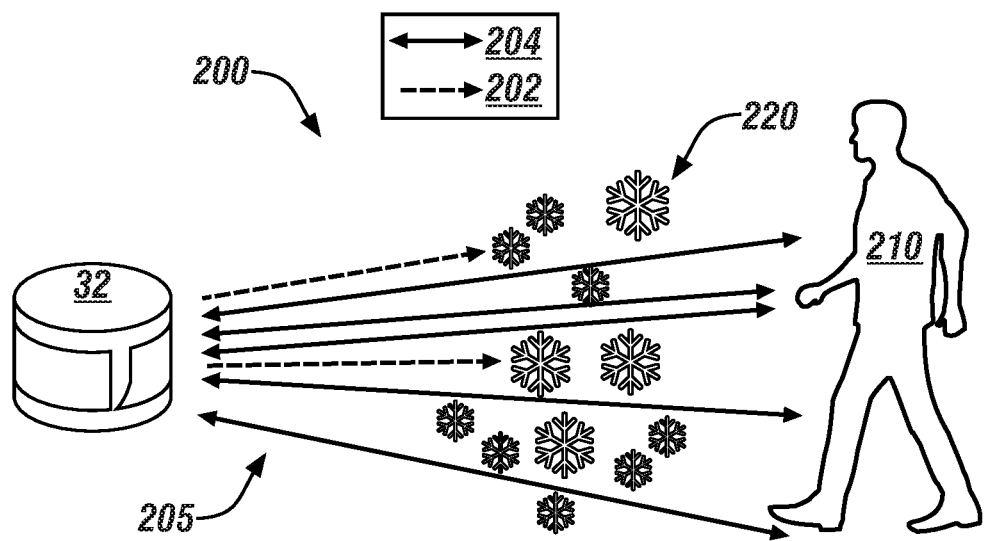
FIG. 2 pictorially shows light emission and reflection associated with operation of an embodiment of the LiDAR sensor that is arranged to monitor a field of view, in accordance with the disclosure.

FIG. 2 pictorially shows light emission and reflection associated with operation of an embodiment of the LiDAR sensor 32 described with reference to FIG. 1 that is arranged to monitor a FOV 200. The FOV 200 may include, by way of non-limiting examples: a travel surface; fixtures such as road signs, guiderails, lamp posts, etc.; buildings; other vehicles; and pedestrians. These elements are indicated by element 210. The FOV 200 may also include precipitation 220, which may be in the form of rain, hail, snow, sleet, fog, smog, smoke, etc. The light emissions emanating from the LiDAR sensor 32 include transmitted laser light beams that are unreflected, indicated by element 202, and transmitted laser beams that are reflected, indicated by element 204. The unreflected transmitted laser light 202 and the reflected transmitted laser light beams 204 form a point cloud 205. The point cloud may be subjected to statistical analysis to determine point cloud metrics, which include, e.g.: a quantity and percentage of the laser beams having associated zero range or reflectivity values; and a mean, median, standard deviation, minimum/maximum interval of range and reflectivity histograms for laser beams having nonzero measurements.

Referring again to FIG. 1, the vehicle 100 includes the LiDAR sensor 32 with an associated plurality of desired control parameters, the first plurality of sensors 50 arranged to monitor ambient environmental states, the second plurality of sensors 54 arranged to monitor vehicle operating conditions, and a controller, e.g., the spatial monitoring controller 35. The spatial monitoring controller 35 is in communication with the first plurality of sensors 50 and the second plurality of sensors 54, and is operatively connected to the LiDAR sensor 32 to control the desired control parameters in accordance with a controller-executable instruction set. The instruction set is described with reference to FIGS. 3 and 4, and includes: monitoring the ambient environmental states via the first plurality of sensors 50; monitoring the vehicle operating conditions via the second plurality of sensors 54; and capturing a point cloud that includes emitted and reflected laser beams via the LiDAR sensor 32. One embodiment of a point cloud 205 is described with reference to FIG. 2. The controller determines metrics for the point cloud, and determines desired control parameters for the LiDAR sensor 32 based upon the ambient environmental conditions, the vehicle operating conditions, and the point cloud metrics. The LiDAR sensor 32 is controlled and operated employing the desired control parameters.

The desired control parameters for the LiDAR sensor 32 are determined employing a reinforcement learning routine in a simulation pre-training mode and then employing the reinforcement learning routine in-use to determine the desired control parameters for the LiDAR sensor 32 that maximize or otherwise optimize the point cloud metrics of the LiDAR sensor 32 based upon the ambient environmental conditions and the vehicle operating conditions.

Reinforcement Learning deals with how some arbitrary being, i.e., an agent should act and behave in a given environment. The way it is done is by giving the agent rewards or punishments based on the actions it has performed on different scenarios. A reinforcement learning task is about training the agent to interact with its environment. The agent transitions between different scenarios of the environment, referred to as states, by performing actions. Actions, in return, yield rewards, which could be positive, negative or zero. The agent's sole purpose is to maximize the total reward it collects over an episode, which is everything that happens between an initial state and a terminal state. Hence, the agent is reinforced to perform certain actions by providing it with positive rewards, and dissuaded from engaging other actions by providing negative rewards. This is how an agent learns to develop a strategy, or a policy. The agent learns how to handle postponed rewards by learning to link the rewards to the actions that really caused them.

Figure 3:
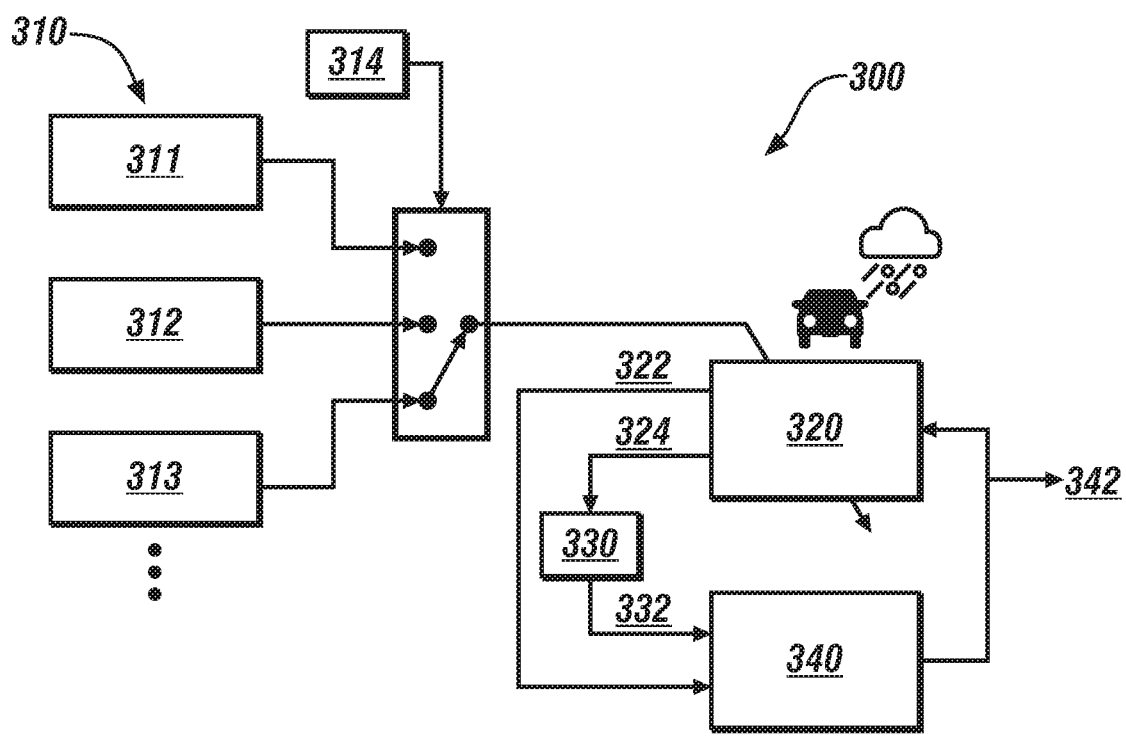
FIG. 3 schematically shows details related to a reinforcement learning routine that is employed in a simulation pre-training mode to determine desired control parameters for a LiDAR sensor, in accordance with the disclosure.

FIG. 3 schematically shows details related to a reinforcement learning routine that is employed in a simulation pre-training mode 300 for an embodiment of the vehicle 100 described with reference to FIG. 1 to determine the desired control parameters for the LiDAR sensor 32 that maximize the point cloud metrics of the LiDAR sensor 32 based upon the ambient environmental conditions and the vehicle operating conditions. The simulation pre-training mode 300 may be implemented as algorithmic code and associated calibrations in the spatial monitoring controller 35 as part of the spatial monitoring system 30. The simulation pre-training mode 300 includes a plurality of weather and travel surface scenarios 310 that are individually selected by a selector function 314 and provided as input to a physics-based simulator 320. The simulator 320 generates a plurality of observable states 322 in the form of the ambient environmental conditions and the vehicle operating conditions. The simulator 320 also generates the point cloud metrics 324, which are provided as inputs to a reward function 330, which generates a cumulative discounted return 332. The cumulative discounted return 332 and the observable states 322 are input to a reinforcement learning agent 340, which determines an action space 342 that includes updates to the desired control parameters for the LiDAR sensor 32, and a plurality of weights $w_1, \ldots, w_6$ are calibratable parameters that are associated with the reinforcement learning agent 340. The action space 342 including the updates to the desired control parameters for the LiDAR sensor 32 are provided as inputs to the simulator 320, and the entire operation executes iteratively until there is convergence between the desired control parameters for the LiDAR sensor 32 that maximizes the point cloud metrics of the LiDAR sensor 32 for the selected weather and travel surface scenarios 310. The contents of the action space 342, in the form of states of desired control parameters for the LiDAR sensor 32, are employed as a plurality of scenario-specific weights $w_1, \ldots, w_6$ for each of a plurality of weather and travel surface scenarios 410 that are described with reference to FIG. 4.

Referring again to FIG. 3, each of the weather and travel surface scenarios 310 may include a type of highway, e.g., a two-way street, a multi-line street, a multi-lane limited access highway, etc. Each of the weather and travel surface scenarios 310 may include a description of traffic density. Each of the weather and travel surface scenarios 310 may include a time of day. Each of the weather and travel surface scenarios 310 may include an indication of a type of and magnitude of precipitation, if any. Each of the weather and travel surface scenarios 310 may include a description of the road surface, e.g., clear, wet, snow-covered, etc. For purposes of describing the concepts, the weather and travel surface scenarios 310 include, by way of non-limiting examples, a first scenario 311, a second scenario 312, and a third scenario 313. The first scenario 311 may include weather that is a clear, sunny day with regular traffic in an urban highway setting. The second scenario 312 may include weather that is rainy, with heavy traffic in an urban setting. The third scenario 313 may include weather that is snowy, with regular traffic in a limited access highway setting. This list of scenarios is provided for purposes of illustration. Other weather, traffic, roadway, time-of-day, etc. settings may be developed, simulated and evaluated in the simulation pre-training mode 300.

Designing a good reward function $r(s_t, a_t)$ and the cumulative discounted return $R_t$ for each action $a_t$ in state $s_t$ is critical for a successful RL implementation. In one embodiment, the cumulative discounted return $R_t$ for each action $a_t$ in state $s_t$ may be implemented and defined as follows:

$$R_t = \Sigma_{i=1}^{T} \gamma^{i-t} r(s_i, a_i) \tag{1}$$

wherein:

$$r(s_i, a_i) = w_1\{\tanh[m_1(\%NZR - \alpha_1)] - b_1\} + \tag{2}$$
$$w_2\{\tanh[m_2(\%FR\,|_{d>d_F} - \alpha_2^L)] + \tanh[m_2(\alpha_2^U - \%FR\,|_{d>d_F})] - b_2\} +$$
$$w_3\{\tanh[m_3(\%CR\,|_{d<d_C} - \alpha_3^L)] + \tanh[m_3(\alpha_3^U - \%CR\,|_{d<d_C})] - b_3\} +$$
$$w_4\{\tanh[m_4(\%HI\,|_{I>I_H} - \alpha_4^L)] + \tanh[m_4(\alpha_4^U - \%HI\,|_{I>I_H})] - b_4\} +$$
$$w_5\{\tanh[m_5(\%LI\,|_{I<I_L} - \alpha_5^L)] + \tanh[m_5(\alpha_5^U - \%LI\,|_{I<I_L})] - b_5\} -$$
$$w_6(\%FP - b_6)$$

wherein:
  $\gamma$ is a discount factor;
  weights $w_1, \ldots, w_6$, slopes $m_1, \ldots, m_6$ and intercepts $b_1, \ldots, b_6$ are calibratable parameters; One recommended calibration set for the intercepts, in particular, is: $b_1 = b_6 = 0$;
  $b_i = \tanh(m_i \alpha_i^U) - \tanh(m_i \alpha_i^L)$ for $i = 2, \ldots, 5$;
  $\alpha_1, \ldots, \alpha_5$, $d_F$, $d_C$, $I_H$ and $I_L$ are trainable parameters; Note that $\alpha_2, \ldots, \alpha_5$ are intervals so they each constitute two scalar trainable parameters (lower and upper bounds);
  % NZR is a ratio of nonzero returns to total returns, and refers to the percentage of points with neither zero range nor reflectivity (intensity) values. As such, the $w_1$ term applies a positive reward if % NZR>$\alpha_1$ and a negative reward otherwise (if $b_1 = 0$);
  % FP is a ratio of false positive objects to total objects. The ratio of false positives (% FP) is available in simulation, i.e., during execution of the system described with reference to FIG. 3. When not available in a deployment stage that is described with reference to FIG. 4, the weight $w_6$ may be set to zero. The weight w6 may be deactivated in the deployment stage when there is no well-defined feedback or ground-truth from the perception system such that the system is unable to identify an object as a phantom/ghost object or a false positive;

% CR represents close range returns, which are positively rewarded for being less than $\alpha_3^U$ AND more than $\alpha_3^L$ percent of the total Non-Zero Returns, when the value of % CR gets outside the desired interval $[\alpha_3^L, \alpha_3^U]$, the reward diminishes and can become negative depending on the distance to the desired interval that is learned by the agent; and % LI represents low intensity returns, which are positively rewarded for being less than $\alpha_5^U$ AND more than $\alpha_5^L$ percent of total Non-Zero Returns, and otherwise less positively or even negatively rewarded.

The other terms 2 to 5, similarly apply a positive or diminished, and possibly negative reward depending on the distance between the percentage term and the respective α-interval, i.e. $[\alpha_i^L, \alpha_i^U]$, including as follows:

% $FR|_{d>d_F}$ is the percentage of nonzero point cloud far-range points with range (distance) greater than $d_F$;

% $CR|_{d<d_C}$ is the percentage of close-range points defined by $d<d_C$;

% $HI|_{I>I_H}$ is the percentage of high-intensity (reflectivity) values with intensity greater than $I_H$; and % $LI|_{I<I_L}$ is the percentage of low intensity points characterized by $I<I_L$.

The $w_6$ term applies a negative reward for percentage of false positive artifacts created in the perception system due to the noisy point cloud. This term can be activated during simulation runs since the total number of phantom or false positive objects compared to the number of real objects in the scene is known during simulation; and, deactivated $w_6=0$ during real-world deployment if needed.

Figure 4:
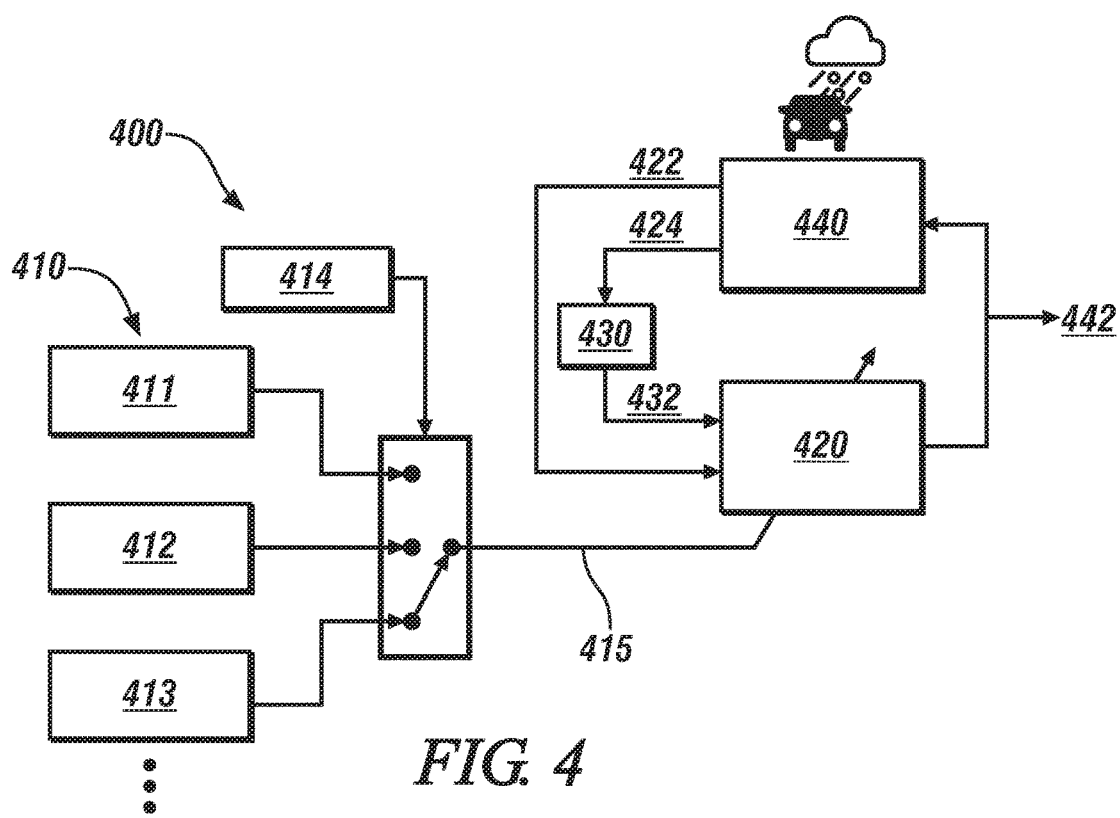
FIG. 4 schematically shows details related to in-use deployment of a reinforcement learning routine to refine desired control parameters for a LiDAR sensor, in accordance with the disclosure.

FIG. 4 schematically shows details related to in-use deployment of a reinforcement learning routine 400 on an embodiment of the vehicle 100 described with reference to FIG. 1 to update and refine the desired control parameters for the LiDAR sensor 32 to maximize the point cloud metrics of the LiDAR sensor 32 based upon the ambient environmental conditions and the vehicle operating conditions. The simulation reinforcement learning routine 400 may be implemented as algorithmic code and associated calibrations in the spatial monitoring controller 35 as part of the spatial monitoring system 30. The in-use deployment of the reinforcement learning routine 400 includes a sensed real-world environment 420, a reward function 330, and a reinforcement learning agent 440. The sensed real-world environment 420 is determined based upon inputs from the first plurality of sensors 50 that are arranged to monitor vehicle operating conditions, and the second plurality of sensors 54 that are arranged to monitor ambient environmental conditions, as well as inputs communicated to the vehicle 100 via V2X communication.

The in-use deployment of the reinforcement learning routine 400 includes a plurality of weather and travel surface scenarios 410 with associated scenario-specific weights $w_1, \ldots, w_6$ for each of a plurality of weather and travel surface scenarios, which are analogous to the plurality of weather and travel surface scenarios 310 that are described with reference to FIG. 3. Initial values for the scenario-specific weights $w_1, \ldots, w_6$ may be determined during execution of the simulation pre-training mode 300 described with reference to FIG. 3. As shown, there are first, second and third sets of weights 411, 412, 413, respectively, wherein the first set of weights 411 is associated with the first scenario 311, the second set of weights 412 is associated with the second scenario 312, and the third set of weights 413 is associated with the third scenario 313. This list of weights and associated scenarios are provided for purposes of illustration. Weights for other weather, traffic, roadway, time-of-day, etc. scenarios may be developed and evaluated.

The reinforcement learning routine 400 selects, via selector 414, one of the plurality of scenario-specific scenarios 410 and associated weights $w_1, \ldots, w_6$, which is indicated by element 415. The selected scenario-specific weights 415 is selected based upon inputs from the first plurality of sensors 50 that are arranged to monitor vehicle operating conditions, and the second plurality of sensors 54 that are arranged to monitor ambient environmental conditions, as well as inputs communicated to the vehicle 100 via V2X communication.

The selected scenario-specific weights $w_1, \ldots, w_6$ 415 are provided as inputs to a reinforcement learning agent 440, which is analogous to the reinforcement learning agent 340 that is described with reference to FIG. 3.

The sensed real-world environment 420 generates a plurality of observable states 422 in the form of the ambient environmental conditions and the vehicle operating conditions. The sensed real-world environment 420 also generates the point cloud metrics 424, which are provided as inputs to the reward function 430, which generates a cumulative discounted return 432. The cumulative discounted return 432 and the observable states 422 are input to the reinforcement learning agent 440, which determines an action space 442 that includes updates to the desired control parameters for the LiDAR sensor 32. The action space 442 including the updates to the desired control parameters for the LiDAR sensor 32 are provided as inputs to the sensed real-world environment 420, and the entire operation executes iteratively update the desired control parameters for the LiDAR sensor 32 that maximizes the point cloud metrics of the LiDAR sensor 32 for the real-world weather and travel surface scenarios 410. The contents of the action space 442, in the form of states of desired control parameters for the LiDAR sensor 32, are employed to control an embodiment of the LiDAR sensor 32 to capture an image of a field-of-view proximal to the vehicle 100 based upon the desired control parameters.

The weather and travel surface scenarios 410 include, by way of non-limiting examples, a first scenario 411, a second scenario 412, and a third scenario 413. Each of the weather and travel surface scenarios 410 may include a type of highway, e.g., a two-way street, a multi-line street, a multi-lane limited access highway, etc. Each of the weather and travel surface scenarios 410 may include a description of traffic density. Each of the weather and travel surface scenarios 410 may include a time of day. Each of the weather and travel surface scenarios 410 may include an indication of a type of and magnitude of precipitation, if any. Each of the weather and travel surface scenarios 410 may include a description of the road surface, e.g., clear, wet, snow-covered, etc. Each of the weather and travel surface scenarios 410 may include an ambient temperature. By way of example, the first scenario 411 may include weather that is a clear, sunny day with regular traffic in an urban highway setting. The second scenario 412 may include weather that is rainy, with heavy traffic in an urban setting. The third scenario 413 may include weather that is snowy, with regular traffic in a limited access highway setting. This list of scenarios is provided for purposes of illustration. Other weather, traffic, roadway, time-of-day, etc. settings may be developed, for use by the reinforcement learning agent 440.

Figure 5:
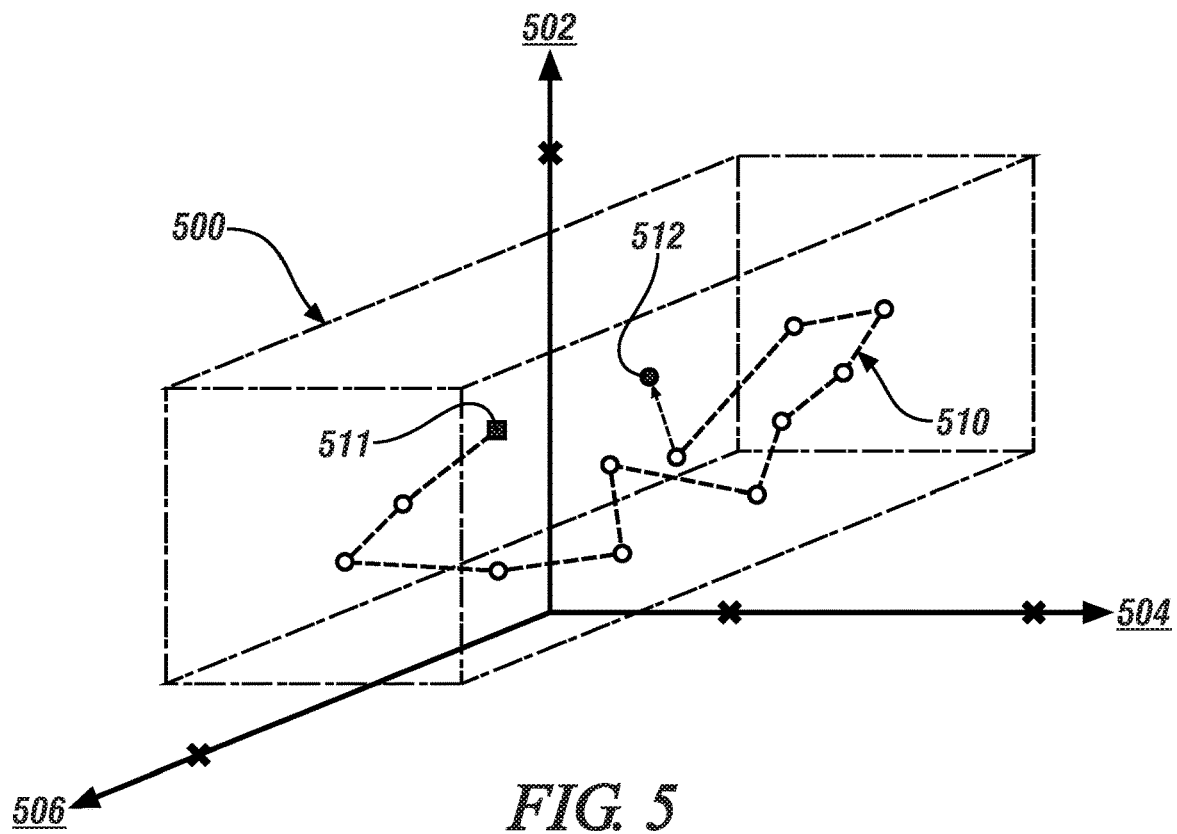
FIG. 5 graphically shows a three-dimensional feasible search space for a plurality of desired control parameters for an embodiment of the LiDAR sensor, in accordance with the disclosure.

FIG. 5 graphically shows a three-dimensional feasible search space 500 for a plurality of desired control parameters for an embodiment of the LiDAR sensor 32. The desired control parameters as shown includes a spinning rate 502, a laser power 504, and an acceptable noise level 506. The feasible search space 500 defines metes and bounds of search parameters that may be evaluated by the simulation pre-training mode 300 described with reference to FIG. 3 to determine the calibratable parameters in the form of the weights and the desired control parameters for operating the LiDAR sensor 32 described with reference to FIG. 1. As shown, a search path 510 including an initial search point 511 and a final search point 512 are shown. The search path 510 assists the agent to learn good policies that lead to finding efficient search paths depending on the unique situation and conditions of operation at that particular time, which may not be known in advance. During the learning-by-simulation phase, the agent explores millions of search paths like search path 510 in different scenarios and gets rewarded differently for each search path and each point along it depending on the situation. As a result, it learns certain good policies that achieve higher cumulative rewards under different circumstances. During the deployment stage in real-life, the agent exploits those learned policies to generate an efficient search path 510 that leads to optimal operation settings for the LiDAR sensor 32, i.e., optimal points in the action space. These settings adaptively and dynamically change based on the conditions of operation at the particular time, which may not be known in advance. This off-policy search during simulation and on-policy search during deployment strikes an efficient balance between exploration and exploitation for the reinforcement learning agent to fulfill its task properly.

There may be certain constraints on the desired control parameters. Depending on their nature, the constraints may have to be either added as a negative reward penalty term in the reward function equation, i.e., soft constraints, or they need to be imposed explicitly on the search space by removing certain hyper-surfaces or hyper-volumes from the n-dimensional search space, i.e., hard constraints. An example for the soft constraints is that increasing the laser power even if leading to increased point cloud quality in the form of an increased signal-to-noise ratio might be undesired in terms of power consumption or LiDAR health for sustained periods of time. This can be added as a penalty term to the reward function, such as adding a term $-w7*P$ to EQ. 2 in which P is a penalizing term. An example of a hard constraint may include preserving eye-safety regulation protocols. By way of example, a mechanically spinning LiDAR includes two desired control parameters of spinning rate and laser power. The action space for this LiDAR is a rectangle in the spin rate-laser power plane, e.g., spin rate as the horizontal direction, and laser power in the vertical direction. Depending on the wavelength of the laser utilized, certain regions at low spin rate and high laser power are not permissible. In this case, the top left of the action-space rectangle can be eliminated both in the simulation and deployment stages.

Figure 6:
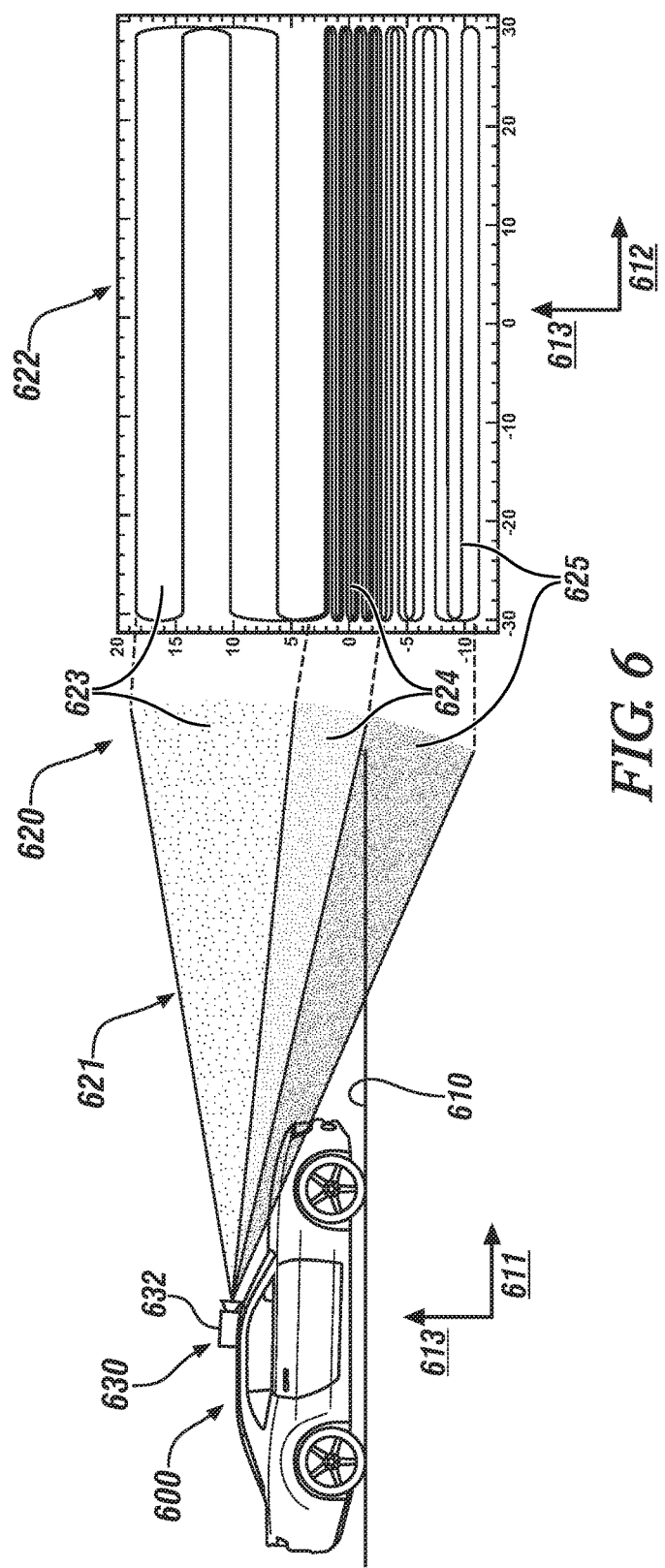
FIG. 6 pictorially shows a side view of a vehicle including a LiDAR sensor that are arranged on a travel surface, and further graphically portrays an associated laser scan pattern for the LiDAR sensor, including a first depiction in a yz plane, and a corresponding second depiction in an xy plane, in accordance with the disclosure.

FIG. 6 pictorially shows a side view of an example vehicle 600 arranged on a travel surface 610. The vehicle 600 includes a spatial monitoring system 630 that includes a LiDAR sensor 632. The LiDAR sensor 632 is arranged as a MEMS scanning device in this embodiment. The LiDAR sensor 632 is controlled and operated employing the desired control parameters that may be developed employing the reinforcement learning routine 400 that described with reference to FIG. 4 and the simulation pre-training mode 300 that is described with reference to FIG. 3. The vehicle 600 and the travel surface 610 define a three-dimensional coordinate system including a longitudinal or y-axis 611, a lateral or x-axis 612 and an elevation or z-axis 613. The vehicle 600 as shown is depicted in the yz plane. A laser scan pattern 620 is also graphically portrayed, including a first depiction 621 in the yz plane, and a corresponding second depiction 622 in the xy plane. The laser scan pattern 620 includes an upper level 623, a mid-level 624, and a lower level 625. The upper level 623 is arranged to capture fixed objects, etc. such as stop signs, and may be controlled at a low density scan pattern under certain circumstances. The mid-level 624 is arranged to capture targets on the travel surface 610, such as pedestrians and other vehicles, and is controlled at a high density scan pattern under certain circumstances. The lower level 625 is arranged to capture ground objects, such as buildings and guiderails, and is controlled at a medium density scan pattern under certain circumstances. During operation of the vehicle The laser scan pattern 620 can be commanded at various operating parameters based on mission/operational conditions, including but not limited to adaptive orientation control of scanning lines, and dynamically adjusted densities across the field-of-view in the xz plane. This may include vertical density adjustment and horizontal scanning speed adjustments to effectively and dynamically zero in on regions of interest. This may also include a dynamic adjustment of stride/interlacing amount. This operation facilitates dynamic controlling of desired control parameters such as scan density across field-of-view, the frame rate, and the laser power for the LiDAR sensor to control the LiDAR sensor to capture an image of a field-of-view proximal to the vehicle based upon the desired control parameters.

Expert a priori knowledge may be used to deterministically set some calibration parameters, including adjusting scanning pattern calibrations based upon a physics-based understanding of the effects of ambient humidity, temperature and pressure on laser propagation and reflection, and an understanding of the effect of aerodynamic flow patterns on laser propagation and reflection. By way of example, ambient humidity may alter light refraction by deterministic amounts, and may be accounted for without testing. The scanning pattern may be adjusted to minimize interference with precipitation particles such as snow, rain, water droplets or hail, and other airborne elements such as sand, dust, insect swarms, and aerosols that may be moving with the aerodynamic flows. Any of the foregoing precipitation particles and other airborne elements may affect laser propagation through refraction, reflection, and translucency. Although for a front facing lidar the default horizontal pattern might be acceptable, i.e., almost perpendicular to the particle flow streamlines, for the corner and side facing lidars the pattern is not optimal. Aerodynamic simulations can be used to predetermine sensible scanning patterns for LiDARs that are facing different directions, instead of searching through all possibilities using reinforcement learning. Reinforcement learning can still be used for minor fine-tuning of the synthesized scanning patterns in a lower dimensional space.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A spatial monitoring system for a vehicle, the spatial monitoring system comprising:
   a LiDAR sensor;
   a first plurality of sensors arranged to monitor ambient environmental states, including one or more of temperature, pressure, humidity, and precipitation;
   a second plurality of sensors arranged to monitor vehicle operating conditions;
   a controller, in communication with the first plurality of sensors and the second plurality of sensors, and operatively connected to the LiDAR sensor, the controller including an instruction set, the instruction set being executable to:
   monitor, via the first plurality of sensors, the ambient environmental states,
   monitor, via the second plurality of sensors, the vehicle operating conditions,
   capture, via the LiDAR sensor, a point cloud,
   determine point cloud metrics for the point cloud, and
      determine desired control parameters for the LiDAR sensor based upon the ambient
   environmental conditions, the vehicle operating conditions, and the point cloud metrics, and control the LiDAR sensor to capture an image of a field-of-view proximal to the vehicle based upon the desired control parameters.

2. The spatial monitoring system of claim 1, wherein the LiDAR sensor comprises a mechanical spinning LiDAR sensor, wherein the desired control parameters comprise a spinning rate and a laser power level; and
   wherein the instruction set being executable to determine the desired control parameters for the LiDAR sensor based upon the ambient environmental conditions, the vehicle operating conditions and the point cloud metrics comprises the instruction set being executable to determine the desired control parameters for one of the spinning rate and the laser power level of the LiDAR sensor based upon the ambient environmental conditions, the vehicle operating conditions and the point cloud metrics.

3. The spatial monitoring system of claim 1, wherein the LiDAR sensor comprises a solid state LiDAR sensor, wherein the desired control parameters comprise a scanning pattern, a scan density across the field-of-view, a frame rate, and a laser power for the LiDAR sensor, and
   wherein the instruction set being executable to determine the desired control parameters for the LiDAR sensor based upon the ambient environmental conditions, the vehicle operating conditions and the point cloud metrics comprises the instruction set being executable to determine the desired control parameters for one of the scanning pattern, the scan density across the field-of-view, the frame rate, and the laser power for the LiDAR sensor based upon the ambient environmental conditions, the vehicle operating conditions and the point cloud metrics.

4. The spatial monitoring system of claim 1, wherein the first plurality of sensors arranged to monitor ambient environmental states comprises a plurality of sensors configured to monitor ambient pressure and temperature.

5. The spatial monitoring system of claim 1, wherein the second plurality of sensors arranged to monitor vehicle operating conditions comprises a plurality of sensors configured to monitor vehicle wheel speed and steering angle.

6. The spatial monitoring system of claim 1, wherein the instruction set being executable to determine point cloud metrics of the LiDAR sensor comprises the instruction set being executable to determine a quantity of points with zero range or reflectivity values, mean, median, standard deviation and a minimum/maximum interval of range and reflectivity for nonzero measurements for the point cloud of the LiDAR sensor.

7. The spatial monitoring system of claim 1, wherein the instruction set being executable to determine the desired control parameters for the LiDAR sensor based upon the ambient environmental conditions, the vehicle operating conditions, and the point cloud metrics of the LiDAR sensor comprises the instruction set being executable to employ a reinforcement learning routine in a simulation pre-training mode to determine the desired control parameters for the LiDAR sensor that maximize the point cloud metrics of the LiDAR sensor based upon the ambient environmental conditions and the vehicle operating conditions.

8. The spatial monitoring system of claim 1, wherein the instruction set being executable to determine the desired control parameters for the LiDAR sensor based upon the ambient environmental conditions, the vehicle operating conditions, and the point cloud metrics of the LiDAR sensor comprises the instruction set being executable to employ a reinforcement learning routine in-use to determine the desired control parameters for the LiDAR sensor that maximize the point cloud metrics of the LiDAR sensor based upon the ambient environmental conditions and the vehicle operating conditions.

9. A vehicle, comprising:
   an advanced driver assistance system (ADAS) and a spatial monitoring system;
   wherein the spatial monitoring system includes:
      a LiDAR sensor;
      a first plurality of sensors arranged to monitor ambient environmental states, including one or more of temperature, pressure, humidity, and precipitation;
      a second plurality of sensors arranged to monitor vehicle operating conditions; and
      a controller, in communication with the first plurality of sensors and the second plurality of sensors, and operatively connected to the LiDAR sensor, the controller including an instruction set, the instruction set being executable to:
      monitor, via the first plurality of sensors, the ambient environmental states, monitor, via the second plurality of sensors, the vehicle operating conditions, capture, via the LiDAR sensor, a point cloud,
      determine metrics for the point cloud, and
      determine desired control parameters for the LiDAR sensor based upon the ambient environmental conditions, the vehicle operating conditions, and the point cloud metrics, and
      control the LiDAR sensor to capture an image of a field-of-view proximal to the vehicle based upon the desired control parameters;
   wherein the ADAS controls operation of the vehicle based upon the image of a field-of- view proximal to the vehicle.

10. The vehicle of claim 9, wherein the LiDAR sensor comprises a mechanical spinning LiDAR sensor, wherein the desired control parameters comprise a spinning rate and a laser power level; and wherein the instruction set being executable to determine the desired control parameters for the LiDAR sensor based upon the ambient environmental conditions, the vehicle operating conditions and the point cloud metrics comprises the instruction set being executable to determine the desired control parameters for one of the spinning rate and the laser power level of the LiDAR sensor based upon the ambient environmental conditions, the vehicle operating conditions and the point cloud metrics.

11. The vehicle of claim 9, wherein the LiDAR sensor comprises a solid state LiDAR sensor, wherein the desired control parameters comprise a scanning pattern, a scan density across the field-of-view, a frame rate, and a laser power for the LiDAR sensor, and wherein the instruction set being executable to determine the desired control parameters for the LiDAR sensor based upon the ambient environmental conditions, the vehicle operating conditions and the point cloud metrics comprises the instruction set being executable to determine the desired control parameters for one of the scanning pattern, the scan density across the field-of-view, the frame rate, and the laser power for the LiDAR sensor based upon the ambient environmental conditions, the vehicle operating conditions and the point cloud metrics.

12. The vehicle of claim 9, wherein the first plurality of sensors arranged to monitor ambient environmental states comprises a plurality of sensors configured to monitor ambient pressure and temperature.

13. The vehicle of claim 9, wherein the second plurality of sensors arranged to monitor vehicle operating conditions comprises a plurality of sensors configured to monitor vehicle wheel speed and steering angle.

14. The vehicle of claim 9, wherein the instruction set being executable to determine point cloud metrics of the LiDAR sensor comprises the instruction set being executable to determine a quantity of points with zero range or reflectivity values, mean, median, standard deviation and a minimum/maximum interval of range and reflectivity for nonzero measurements for the point cloud of the LiDAR sensor.

15. The vehicle of claim 9, wherein the instruction set being executable to determine the desired control parameters for the LiDAR sensor based upon the ambient environmental conditions, the vehicle operating conditions, and the point cloud metrics of the LiDAR sensor comprises the instruction set being executable to employ a reinforcement learning routine in a simulation pre-training mode to determine the desired control parameters for the LiDAR sensor that maximize the point cloud metrics of the LiDAR sensor based upon the ambient environmental conditions and the vehicle operating conditions.

16. The vehicle of claim 9, wherein the instruction set being executable to determine the desired control parameters for the LiDAR sensor based upon the ambient environmental conditions, the vehicle operating conditions, and the point cloud metrics of the LiDAR sensor comprises the instruction set being executable to employ a reinforcement learning routine in-use to determine the desired control parameters for the LiDAR sensor that maximize the point cloud metrics of the LiDAR sensor based upon the ambient environmental conditions and the vehicle operating conditions.

17. A method for monitoring a spatial environment for a vehicle, method comprising:
   monitoring a plurality of ambient environmental states, including one or more of temperature, pressure, humidity, and precipitation;
   monitoring vehicle operating conditions;
   capturing, via a LiDAR sensor, a point cloud,
   determining metrics for the point cloud, and
   determining desired control parameters for the LiDAR sensor based upon the ambient environmental conditions, the vehicle operating conditions, and the point cloud metrics, and controlling the LiDAR sensor to capture an image of a field-of-view proximal to the vehicle based upon the desired control parameters.

18. The method of claim 17,
   wherein monitoring vehicle operating conditions includes monitoring an ambient pressure and ambient temperature;
   wherein monitoring vehicle operating conditions comprises monitoring vehicle wheel speed and steering angle; and
   wherein determining metrics for the point cloud comprises determining a quantity of points with zero range or reflectivity values, and a mean, a median, a standard deviation, and a minimum/maximum interval of range and reflectivity for nonzero measurements for the point cloud of the LiDAR sensor.

19. The method of claim 17, wherein determining the desired control parameters for the LiDAR sensor based upon the ambient environmental conditions, the vehicle operating conditions, and the point cloud metrics of the LiDAR sensor comprises executing a reinforcement learning routine in a simulation pre-training mode to determine the desired control parameters for the LiDAR sensor that maximize the point cloud metrics of the LiDAR sensor based upon the ambient environmental conditions and the vehicle operating conditions.

20. The method of claim 17, determining the desired control parameters for the LiDAR sensor based upon the ambient environmental conditions, the vehicle operating conditions, and the point cloud metrics of the LiDAR sensor comprises executing a reinforcement learning routine in-use to determine the desired control parameters for the LiDAR sensor that maximize the point cloud metrics of the LiDAR sensor based upon the ambient environmental conditions and the vehicle operating conditions.

* * * * *